US012798088B2

(12) United States Patent
Azuma et al.

(10) Patent No.: US 12,798,088 B2
(45) Date of Patent: Nov. 17, 2026

(54) ROBOT SYSTEM, ROBOTIC PROCESSING METHOD, AND PROCESSING PROGRAM

(71) Applicant: KAWASAKI JUKOGYO KABUSHIKI KAISHA, Kobe (JP)

(72) Inventors: Kentaro Azuma, Kobe (JP); Masahiko Akamatsu, Kobe (JP); Takanori Kozuki, Kobe (JP); Hiroki Kinoshita, Kobe (JP); Hitoshi Hasunuma, Kobe (JP); Kazuki Kurashima, Kobe (JP); Shoichi Nishio, Kobe (JP); Hiroki Tanaka, Kobe (JP); Hiroki Takahashi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 94 days.

(21) Appl. No.: 18/294,206

(22) PCT Filed: Jul. 29, 2022

(86) PCT No.: PCT/JP2022/029382
§ 371 (c)(1),
(2) Date: Feb. 1, 2024

(87) PCT Pub. No.: WO2023/013560
PCT Pub. Date: Feb. 9, 2023

(65) Prior Publication Data

US 2024/0342902 A1 Oct. 17, 2024

(30) Foreign Application Priority Data

Aug. 3, 2021 (JP) ................................ 2021-127844

(51) Int. Cl.
*B25J 9/00* (2006.01)
*B25J 9/16* (2006.01)
*B25J 11/00* (2006.01)

(52) U.S. Cl.
CPC ......... *B25J 9/1633* (2013.01); *B25J 11/0065* (2013.01)

(58) Field of Classification Search
CPC ............................ B25J 9/1633; B25J 11/0065
See application file for complete search history.

(56) References Cited

U.S. PATENT DOCUMENTS 5,331,770 A 7/1994 Ichinohe et al.
2019/0001596 A1* 1/2019 Sugayama .............. B24B 17/02
(Continued)

FOREIGN PATENT DOCUMENTS

JP H03-142159 A 6/1991
JP H05-031659 A 2/1993
(Continued)

*Primary Examiner* — Aaron G Cain
(74) *Attorney, Agent, or Firm* — METROLEX IP LAW GROUP, PLLC; Robert L. Scott, Esq.

(57) ABSTRACT

A robot system 100 includes a robot 1 that removes a processing portion B of an object W by a griding device 11*a* and a controller 3 that controls the robot 1. The controller 3 has a trajectory generator 610 that generates a target trajectory of the griding device 11*a* tracing the processing portion B and a movement commander 60 that executes position control for moving the robot 1 such that the griding device 11*a* moves along the target trajectory while executing elasticity control for moving the robot 1 such that the griding device 11*a* moves so as to deviate from the target trajectory according to reactive force from the object W and the pressing force of the griding device 11*a* on the object W increases according to the distance from the target trajectory.

6 Claims, 10 Drawing Sheets

(56) References Cited

U.S. PATENT DOCUMENTS

| | | | | |
|---|---|---|---|---|
| 2021/0078135 | A1* | 3/2021 | Naderer | B24B 49/006 |
| 2022/0032461 | A1* | 2/2022 | Gupta | B25J 11/0065 |
| 2023/0100222 | A1* | 3/2023 | Ben Shmuel | A44C 17/001 125/30.01 |

FOREIGN PATENT DOCUMENTS

| | | | |
|---|---|---|---|
| JP | H06-289923 | A | 10/1994 |
| JP | 2015-139831 | A | 8/2015 |

* cited by examiner

ROBOT SYSTEM, ROBOTIC PROCESSING METHOD, AND PROCESSING PROGRAM

FIELD

The present disclosure relates to a robot system, a robot processing method, and a processing program.

BACKGROUND

Conventionally, there has been known a system that processes a workpiece using a robot. For example, Patent Document 1 discloses a robot system that moves a robot holding a workpiece according to a rough teaching point while pressing the workpiece against a tool in a desired pressing direction. That is, in this robot system, the workpiece moves substantially along the rough teaching point in a state of the tool being pressed against the workpiece with predetermined force.

CITATION LIST

Patent Document

Patent Document 1: Japanese Unexamined Patent Application Publication No. 06-289923

SUMMARY OF THE INVENTION

In the robot system of Patent Document 1, force control for pressing the tool against the workpiece with the predetermined force is executed. In such force control, action of excessive force on the tool and the workpiece is prevented. On the other hand, the tool traces a trajectory substantially in accordance with the surface of the workpiece, and for this reason, it is difficult to process the workpiece into a shape unrelated to the surface of the workpiece.

The present disclosure has been made in view of such a point, and an objective thereof is to prevent action of excessive force on a tool etc. while processing an object into a desired shape.

A robot system of the present disclosure includes a robot that removes a processing portion of an object by a tool and a controller that controls the robot. The controller has a trajectory generator that generates a target trajectory of the tool tracing the processing portion, and a movement commander that executes position control for moving the robot such that the tool moves along the target trajectory while executing elasticity control for moving the robot such that the tool moves so as to deviate from the target trajectory according to reactive force from the object and the pressing force of the tool on the object increases according to the distance from the target trajectory.

A robot processing method of the present disclosure includes generating a target trajectory of a tool of a robot tracing a processing portion of an object, executing position control for moving the robot such that the tool moves along the target trajectory; and executing, in parallel with the position control, elasticity control for moving the robot such that the tool moves so as to deviate from the target trajectory according to reactive force from the object and the pressing force of the tool on the object increases according to the distance from the target trajectory.

A processing program of the present disclosure causes, for causing a robot to remove a processing portion of an object, a computer to execute generating a target trajectory of a tool of the robot tracing the processing portion of the object, executing position control for moving the robot such that the tool moves along the target trajectory, and executing, in parallel with the position control, elasticity control for moving the robot such that the tool moves so as to deviate from the target trajectory according to reactive force from the object and the pressing force of the tool on the object increases according to the distance from the target trajectory.

According to the robot system, action of excessive force on the tool etc. can be prevented while the object is processed into the desired shape.

According to the robot processing method, action of excessive force on the tool etc. can be prevented while the object is processed into the desired shape.

According to the processing program, action of excessive force on the tool etc. can be prevented while the object is processed into the desired shape.

DESCRIPTION OF EMBODIMENTS

Figure 1:
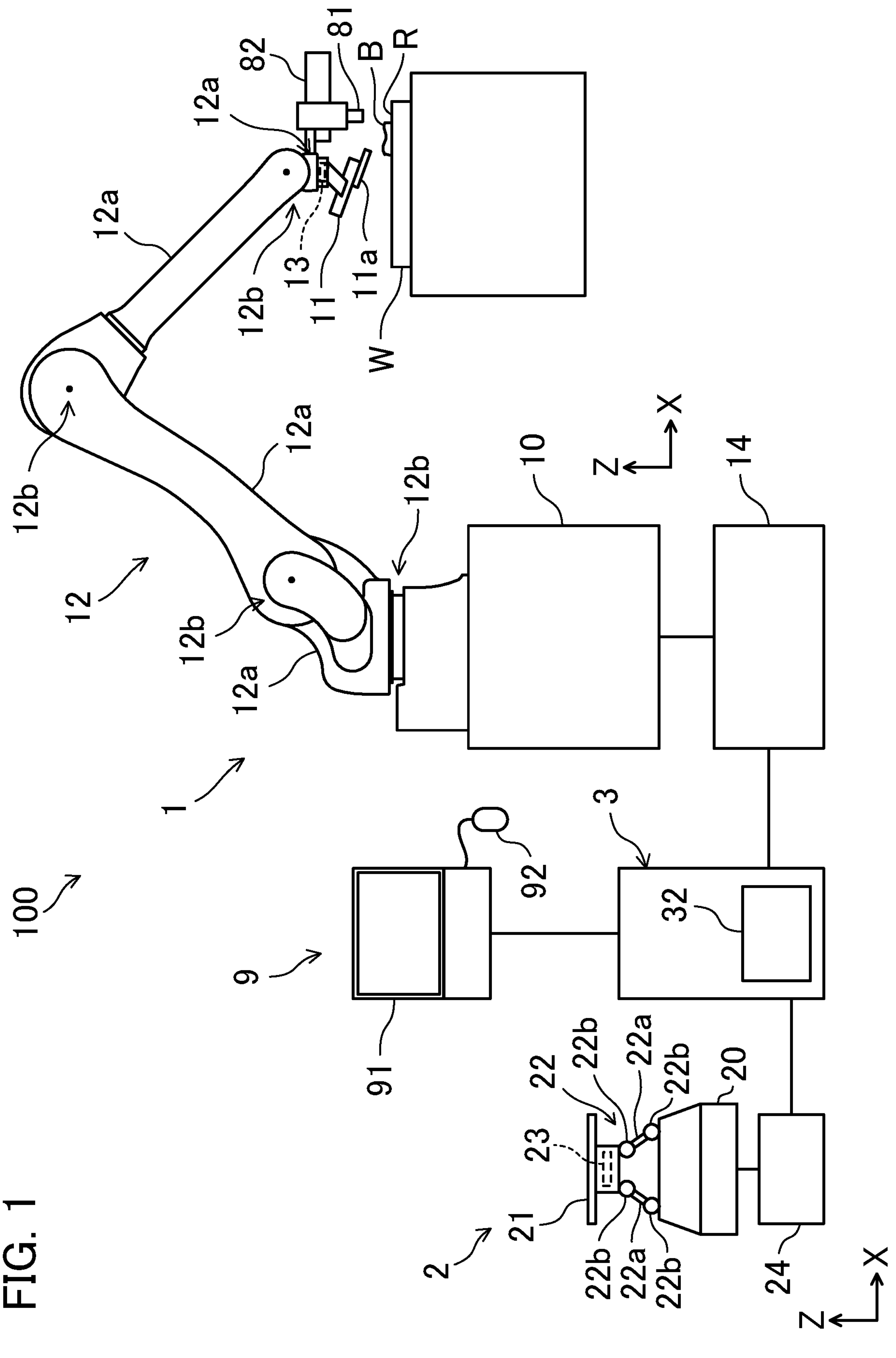
FIG. 1 is a schematic view showing the configuration of a robot system.

Hereinafter, an exemplary embodiment will be described in detail based on the drawings. FIG. 1 is a schematic view showing the configuration of a robot system 100 according to the embodiment.

The robot system 100 includes a robot 1 that processes a processing portion B of an object W and a controller 3 that controls the robot 1. The controller 3 controls the robot 1 to process the processing portion B of the object W. In this example, the object W is a casted product, and the processing portion B is a burr of the object W. The burr includes, for example, a casting burr, a cutting burr, a grinding burr, a shear burr, a plastic deformation burr, a pouring gate burr, and a welding burr. The object W has a reference surface R. The reference surface R is a surface on which the processing portion B is present. That is, the processing portion B is positioned on the reference surface R.

The robot 1 is, for example, an industrial robot. The processing by the robot is removal processing. The removal processing by the robot 1 is, for example, grinding. Note that the removal processing may be cutting or polishing.

The robot system 100 includes a storage 32 that holds an image of the object W and three-dimensional information on the object W. The storage 32 is built in the controller 3. The image of the object W is, for example, a two-dimensional image of the object W. The three-dimensional information on the object W is, for example, point cloud data on the object W.

The robot system 100 may further include an imager 81 that acquires the image of the object W and a three-dimensional scanner 82 that acquires the three-dimensional information on the object W. The three-dimensional scanner 82 is one example of a three-dimensional information acquirer. The storage 32 holds the image of the object W acquired by the imager 81 and the three-dimensional information acquired on the object W by the three-dimensional scanner 82.

The robot system 100 includes a selector 9 that selects the processing portion B from the image of the object W. Further, the selector 9 is configured to select the reference surface R from the image of the object W in addition to the processing portion B. The selector 9 is a device to be operated by an operating person. The selector 9 has a display 91 and an input 92. The input 92 is, for example, a mouse. The selector 9 is communicable with the controller 3, and on the display 91, displays the image of the object W held in the storage 32. The operating person operates the input 92 while viewing the display 91, thereby selecting the processing portion B and the reference surface R from the image of the object W. That is, the selector 9 receives, via the input 92, the selection of the processing portion B and the reference surface R in the image of the object W from the operating person.

The controller 3 derives the processing portion B in the three-dimensional information based on the portion selected in the image of the object W by the selector 9 and the three-dimensional information on the object W. The controller 3 moves the robot 1 based on the three-dimensional information on the processing portion B, and accordingly, the robot 1 removes the processing portion B.

The robot system 100 may further include an operator 2 to be operated by a user. The controller 3 also controls the operator 2. The controller 3 controls movement of the robot 1 according to movement of the operator 2, and in this manner, the object W can also be processed. That is, the robot system 100 can perform automatic control by the robot 1 without the operator 2 and manual control by the robot 1 via the operator 2.

[Robot]

The robot 1 has a base 10, a robot arm 12 supported by the base 10, an end effector 11 coupled to the robot arm 12, and a robot controller 14 that controls the entirety of the robot 1. The robot 1 operates, i.e., moves, the end effector 11 by the robot arm 12, and the object W is processed by the end effector 11.

An orthogonal three-axis robot coordinate system is defined for the robot 1. For example, a Z-axis is set in the upper-lower direction, and an X-axis and a Y-axis perpendicular to each other are set in the horizontal direction.

The end effector 11 has a griding device 11*a*, and as an action, grinds the object W. For example, the griding device 11*a* is a grinder. The grinder may be, for example, of such a type that a discoid grinding stone rotates or a conical or circular columnar grinding stone rotates. Note that the griding device 11*a* may be, for example, an orbital sander, a random orbital sander, a delta sander, or a belt sander. Here, the griding device 11*a* is one example of a tool.

The robot arm 12 is a vertical articulated robot arm. The robot arm 12 has links 12*a*, joints 12*b* connecting the links 12*a* to each other, and a servo motor 15 (see FIG. 2) that rotationally drives the joints 12*b*. The robot arm 12 changes the position of the griding device 11*a*. Further, the robot arm 12 may change the posture of the griding device 11*a*. Note that the robot arm 12 may be, for example, of a horizontal articulated type, a parallel link type, a Cartesian coordinate type, or a polar coordinate type.

The robot 1 has a force sensor. In this example, the robot 1 further has, as the force sensor, a contact force sensor 13 that detects reactive force (hereinafter referred to as "contact force") received from the object W. The contact force sensor 13 is disposed between the robot arm 12 and the end effector 11 (specifically at a coupled portion between the robot arm 12 and the end effector 11). The contact force sensor 13 detects the contact force received from the object W by the end effector 11. The contact force sensor 13 detects force in the three axis directions orthogonal to each other and moment about these three axes.

Note that the force sensor is not limited to the contact force sensor 13. For example, the contact force sensor 13 may detect force only in uniaxial, biaxial, or triaxial directions. Alternatively, the force sensor may be, for example, a current sensor that detects the current of the servo motor 15 of the robot arm 12 or a torque sensor that detects the torque of the servo motor 15.

The imager 81 is attached to the robot arm 12. Specifically, the imager 81 is attached to the link 12*a* of the robot arm 12 closest to the tip end thereof. The imager 81 acquires an RGB image. The image acquired by the imager 81 is input as an image signal from the robot controller 14 to the controller 3.

The three-dimensional scanner 82 is attached to the robot arm 12. Specifically, the three-dimensional scanner 82 is attached to the link 12*a* of the robot arm 12 closest to the tip end thereof. The three-dimensional scanner 82 acquires the point cloud data on the object W as the three-dimensional information. That is, the three-dimensional scanner 82 outputs the three-dimensional coordinates of many points of a point cloud indicating the surface of the object W. The point cloud data of the three-dimensional scanner 82 is input to the controller 3 from the robot controller 14.

Figure 2:
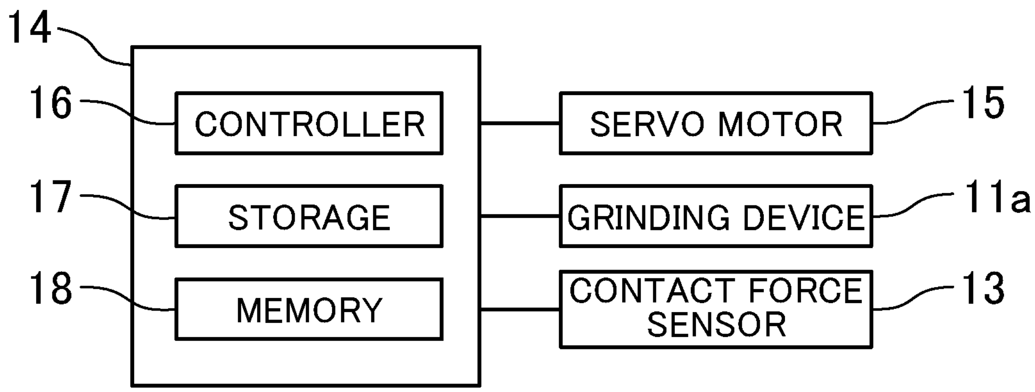
FIG. 2 is a diagram showing a schematic hardware configuration of a robot controller.

FIG. 2 is a diagram showing a schematic hardware configuration of the robot controller 14. The robot controller 14 controls the servo motor 15 of the robot arm 12 and the griding device 11*a*. The robot controller 14 receives a detection signal of the contact force sensor 13. The robot controller 14 transmits information, commands, data etc. to the controller 3, and receives information, commands, data etc. from the controller 3. The robot controller 14 has a controller 16, a storage 17, and a memory 18.

The controller 16 controls the entirety of the robot controller 14. The controller 16 performs various types of arithmetic processing. For example, the controller 16 includes a processor such as a central processing unit (CPU). The controller 16 may include, for example, a micro controller unit (MCU), a micro processor unit (MPU), a field programmable gate array (FPGA), a programmable logic controller (PLC), and a system LSI.

The storage 17 stores programs to be executed by the controller 16 and various types of data. The storage 17 includes, for example, a non-volatile memory, a hard disc drive (HDD), and a solid state drive (SSD).

The memory 18 temporarily stores data etc. For example, the memory 18 includes a volatile memory.

[Operator]

As shown in FIG. 1, the operator 2 has a handle 21 to be operated by the user and an operation force sensor 23 that detects operation force applied from the user to the handle 21. The operator 2 receives input for operating the robot 1 by the manual control, and outputs operation information which is the input information to the controller 3. Specifically, the user operates the operator 2 with gripping the handle 21. Force applied to the handle 21 at this time is detected by the operation force sensor 23. The operation force detected by the operation force sensor 23 is output as the operation information to the controller 3.

The operator 2 may further have a base 20, a support 22 disposed on the base 20 and supporting the handle 21, and an operation controller 24 that controls the entirety of the operator 2. In response to control from the controller 3, the operator 2 applies reactive force of the operation force to the user. Specifically, the operation controller 24 controls the support 22 in response to a command from the controller 3, thereby causing the user to sense the reactive force.

For the operator 2, an orthogonal three-axis operation coordinate system is defined. The operation coordinate system corresponds to the robot coordinate system. That is, the Z-axis is set in the upper-lower direction, and the X-axis and the Y-axis perpendicular to each other are set in the horizontal direction.

The support 22 has links 22*a*, joints 22*b* connecting the links 22*a* to each other, and a servo motor 25 (see FIG. 3) that rotationally drives the joints 22*b*. The support 22 supports the handle 21 so that the handle 21 can be in an arbitrary posture at an arbitrary position in a three-dimensional space. The servo motor 25 rotates corresponding to the position and posture of the handle 21. The rotation amount, i.e., the rotation angle, of the servo motor 25 is uniquely determined.

In this example, the operation force sensor 23 is disposed between the handle 21 and the support 22 (specifically at a coupled portion between the handle 21 and the support 22). The operation force sensor 23 detects force in the three axis directions orthogonal to each other and moment about these three axes.

Note that the operation force detector is not limited to the operation force sensor 23. For example, the operation force sensor 23 may detect force only in uniaxial, biaxial, or triaxial directions. Alternatively, the detector may be, for example, a current sensor that detects the current of the servo motor 25 of the support 22 or a torque sensor that detects the torque of the servo motor 25.

Figure 3:
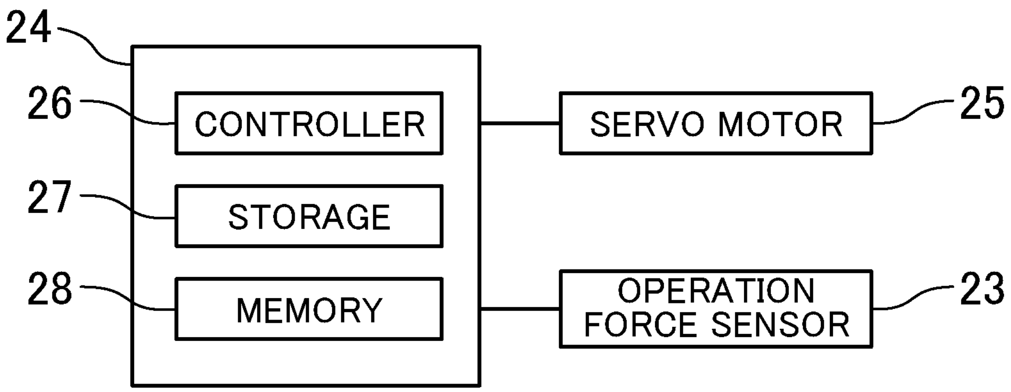
FIG. 3 is a diagram showing a schematic hardware configuration of an operation controller.

FIG. 3 is a diagram showing a schematic hardware configuration of the operation controller 24. The operation controller 24 controls the servo motor 25 to move the support 22. The operation controller 24 receives a detection signal of the operation force sensor 23. The operation controller 24 transmits information, commands, data, etc. to the controller 3, and receives information, commands, data, etc. from the controller 3. The operation controller 24 has a controller 26, a storage 27, and a memory 28.

The controller 26 controls the entirety of the operation controller 24. The controller 26 performs various types of arithmetic processing. For example, the controller 26 includes a processor such as a central processing unit (CPU). The controller 26 may include, for example, a micro controller unit (MCU), a micro processor unit (MPU), a field programmable gate array (FPGA), a programmable logic controller (PLC), and a system LSI.

The storage 27 stores programs to be executed by the controller 26 and various types of data. The storage 27 includes, for example, a non-volatile memory, a hard disc drive (HDD), and a solid state drive (SSD).

The memory 28 temporarily stores data etc. For example, the memory 28 includes a volatile memory.

[Controller]

The controller 3 controls the entirety of the robot system 100, and controls movement of the robot 1 and the operator 2. Specifically, the controller 3 performs the manual control of the robot system 100 according to user operation and the automatic control of the robot system 100. In the manual control, the controller 3 performs master-slave control, specifically bilateral control, between the robot 1 and the operator 2. The operator 2 functions as a master, and the robot 1 functions as a slave. The controller 3 controls movement of the robot 1 according to movement of the operator 2 by user operation, and controls movement of the operator 2 such that the reactive force corresponding to the detection result of the contact force sensor 13 is applied to the user. That is, the griding device 11*a* processes the object W according to user operation, and the reactive force upon the processing is applied to the user via the operator 2. In the automatic control, the controller 3 receives the selection of the processing portion B in the image of the object W from the user, and automatically removes the selected processing portion B by the griding device 11*a*.

Figure 4:
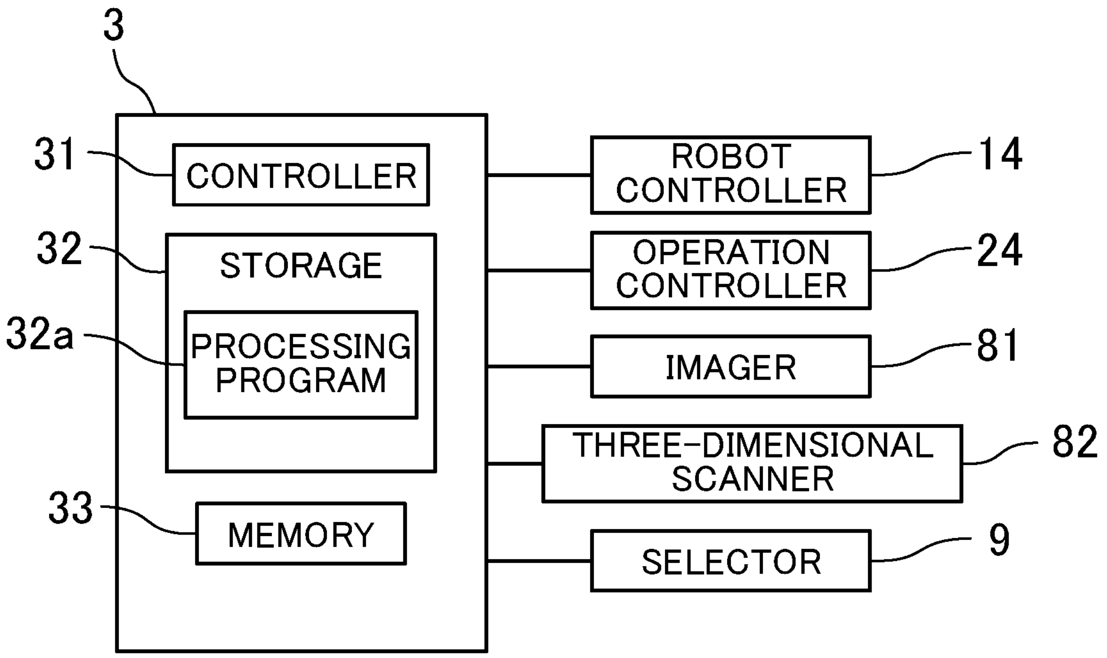
FIG. 4 is a diagram showing a schematic hardware configuration of a controller.

FIG. 4 is a diagram showing a schematic hardware configuration of the controller 3. The controller 3 transmits information, commands, data, etc. to the robot controller 14 and the operation controller 24, and receives information, commands, data, etc. from the robot controller 14 and the operation controller 24. Further, the controller 3 transmits information, commands, data, etc. to the selector 9, and receives information, commands, data, etc. from the selector 9. The controller 3 has a controller 31, the storage 32, and a memory 33. Note that the controller 3 may further have an input operator to be operated by the user to set the control of movement of the robot 1 and the operator 2 and a display that displays the contents of the settings.

The controller 31 controls the entirety of the controller 3. The controller 31 performs various types of arithmetic processing. For example, the controller 31 includes a processor such as a central processing unit (CPU). The controller 31 may include, for example, a micro controller unit (MCU), a micro processor unit (MPU), a field programmable gate array (FPGA), a programmable logic controller (PLC), and a system LSI.

The storage 32 stores programs to be executed by the controller 31 and various types of data. For example, the storage 32 stores a program for controlling the robot system 100. The storage 32 includes, for example, a non-volatile memory, a hard disc drive (HDD), and a solid state drive (SSD). The storage 32 is a non-primary tangible medium. For example, the programs stored in the storage 32 include a processing program 32*a* causing a computer to execute predetermined steps to remove the processing portion B of the object W.

The memory 33 temporarily stores data etc. For example, the memory 33 includes a volatile memory.

<Control of Robot System>

In the robot system 100 configured in this manner, the controller 3 controls movement of the robot 1 according to movement of the operator 2 by user operation, and executes the manual control for controlling movement of the operator 2 such that the reactive force corresponding to the detection result of the contact force sensor 13 is applied to the user. Further, the controller 3 executes the automatic control for identifying the processing portion B based on the image of the object W and the three-dimensional information on the object W and removing the identified processing portion B by the robot 1.

Figure 5:
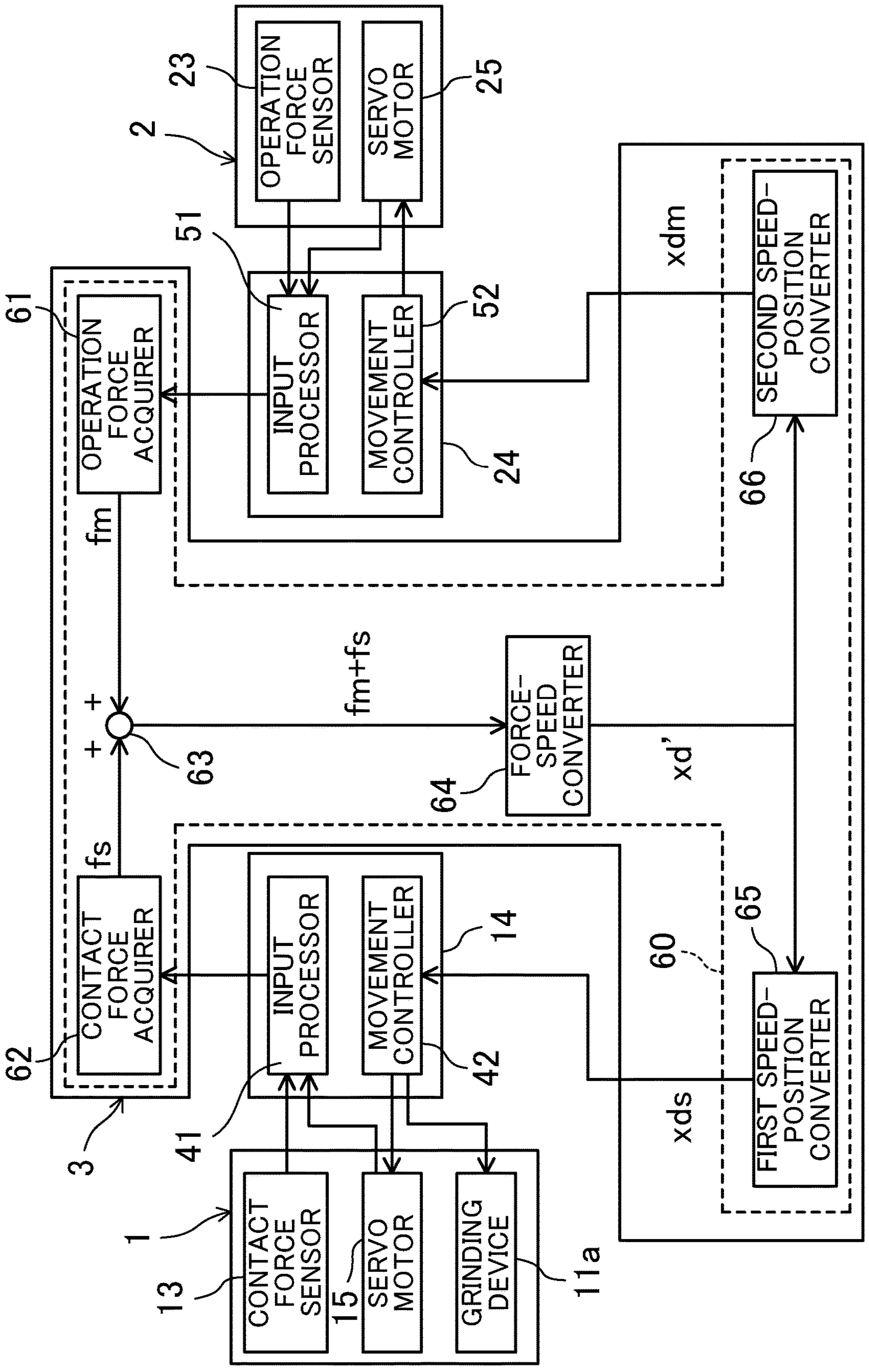
FIG. 5 is a block diagram showing the configuration of a control system for manual control of the robot system.

First, the manual control of the robot system 100 will be described. FIG. 5 is a block diagram showing the configuration of a control system for the manual control of the robot system 100.

The controller 16 of the robot controller 14 reads and loads the programs from the storage 17 into the memory 18, thereby implementing various functions. Specifically, the controller 16 functions as an input processor 41 and a movement controller 42.

The input processor 41 outputs, to the controller 3, information, data, commands, etc. received from the contact force sensor 13 and the servo motor 15. Specifically, the input processor 41 receives a six-axis force detection signal (hereinafter referred to as a "sensor signal") from the contact force sensor 13, and outputs the sensor signal to the controller 3. Moreover, the input processor 41 receives, from the servo motor 15, detection signals of a rotation sensor (e.g., encoder) and a current sensor. The input processor 41 outputs, to the movement controller 42, these detection signals for feedback control for the robot arm 12 by the movement controller 42. Further, the input processor 41 outputs, to the controller 3, these detection signals as position information on the robot arm 12.

The movement controller 42 receives a command position xds from the controller 3, and according to the command position xds, generates a control command for moving the robot arm 12. The movement controller 42 applies current corresponding to the control command to the servo motor 15 to move the robot arm 12 and move the griding device 11*a* to a position corresponding to the command position xds. At this time, the movement controller 42 performs feedback control of movement of the robot arm 12 based on the detection signal of the rotation sensor or the current sensor of the servo motor 15 from the input processor 41. Moreover, the movement controller 42 outputs the control command to the grinding device 11*a* to move the grinding device 11*a*. Accordingly, the grinding device 11*a* grinds the object W.

The controller 26 of the operation controller 24 reads and loads the programs from the storage 27 into the memory 28, thereby implementing various functions. Specifically, the controller 26 functions as an input processor 51 and a movement controller 52.

The input processor 51 outputs, to the controller 3, information, data, commands, etc. received from the operation force sensor 23. Specifically, the input processor 51 receives a six-axis force detection signal from the operation force sensor 23, and outputs the detection signal to the controller 3. Moreover, the input processor 51 receives, from the servo motor 25, detection signals of a rotation sensor (e.g., encoder) and a current sensor. The input processor 51 outputs, to the movement controller 52, these detection signals for feedback control for the support 22 by the movement controller 52.

The movement controller 52 receives a command position xdm from the controller 3, and according to the command position xdm, generates a control command for moving the support 22. The movement controller 52 applies current corresponding to the control command to the servo motor 25 to move the support 22 and move the handle 21 to a position corresponding to the command position xdm. At this time, the movement controller 52 performs feedback control of movement of the support 22 based on the detection signal of the rotation sensor or the current sensor of the servo motor 25 from the input processor 51. Accordingly, the reactive force of the operation force on the handle 21 from the user is applied. As a result, the user can operate the handle 21 while artificially sensing the reactive force from the object W via the handle 21.

The controller 31 of the controller 3 reads and loads the programs from the storage 32 into the memory 33, thereby implementing various functions. Specifically, the controller 31 functions as a movement commander 60 that outputs a movement command to the robot controller 14 and the operation controller 24. More specifically, the controller 31 functions as an operation force acquirer 61, a contact force acquirer 62, an adder 63, a force-speed converter 64, a first speed-position converter 65, and a second speed-position converter 66.

The operation force acquirer 61 receives the detection signal of the operation force sensor 23 via the input processor 51, and based on the detection signal, acquires an operation force fm. The operation force acquirer 61 inputs the operation force fm to the adder 63.

The contact force acquirer 62 receives the sensor signal of the contact force sensor 13 via the input processor 41, and based on the sensor signal, acquires a contact force fs. The contact force acquirer 62 inputs the contact force fs to the adder 63.

The adder 63 calculates the sum of the operation force fm input from the operation force acquirer 61 and the contact force fs input from the contact force acquirer 62. Here, the operation force fm and the contact force fs are in opposite directions, and for this reason, the positive and negative signs are different between the operation force fm and the contact force fs. That is, by addition of the operation force fm and the contact force fs, the absolute value of a resultant force fm+fs which is the sum of the operation force fm and the contact force fs is smaller than the absolute value of the operation force fm. The adder 63 outputs the resultant force fm+fs.

The force-speed converter 64 converts the input resultant force fm+fs into a command speed xd'. The force-speed converter 64 calculates the command speed xd' using a motion model based on a motion equation including an inertial coefficient, a viscosity coefficient (damper coefficient), and a stiffness coefficient (spring coefficient). Specifically, the force-speed converter 64 calculates the command speed xd' based on the following motion equation.

[Equation 1]

$$md \cdot e'' + cd \cdot e' + kd \cdot e = fm + fs \quad (1)$$

where e=xd−xu, xd is a command position, and xu is a target trajectory to be described later. In the case of the manual control, there is no target trajectory, and therefore, e=xd. Moreover, md is an inertial coefficient, cd is a viscosity coefficient, kd is a stiffness coefficient, fm is an operation force, and fs is a contact force. Note that "'" indicates one-time differentiation and "''" indicates two-time differentiation.

Equation (1) is a linear differential equation, and when Equation (1) is solved for xd', Equation (2) is given.

[Equation 2]

$$xd' = xu' + A \quad (2)$$

where A is a term expressed by fm, fs, md, cd, kd, etc.

Equation (2) is stored in the storage 32. The force-speed converter 64 reads Equation (2) from the storage 32 to obtain the command speed xd', and outputs the obtained command speed xd' to the first speed-position converter 65 and the second speed-position converter 66.

The first speed-position converter 65 converts, with reference to the robot coordinate system, the coordinate-converted command speed xd' into the command position xds for the robot 1. For example, in a case where the ratio of the movement amount of the robot 1 to the movement amount of the operator 2 is set, the first speed-position converter 65 multiplies a command position xd obtained from the command speed xd' according to the movement amount ratio, thereby obtaining the command position xds. The first speed-position converter 65 outputs the obtained command position xds to the robot controller 14, specifically the movement controller 42. The movement controller 42 moves the robot arm 12 based on the command position xds, as described above.

The second speed-position converter 66 converts, with reference to the operation coordinate system, the command speed xd' into the command position xdm for the operator 2. The second speed-position converter 66 outputs the obtained command position xdm to the operation controller 24, specifically the movement controller 52. The movement controller 52 moves the support 22 based on the command position xdm, as described above.

Figure 6:
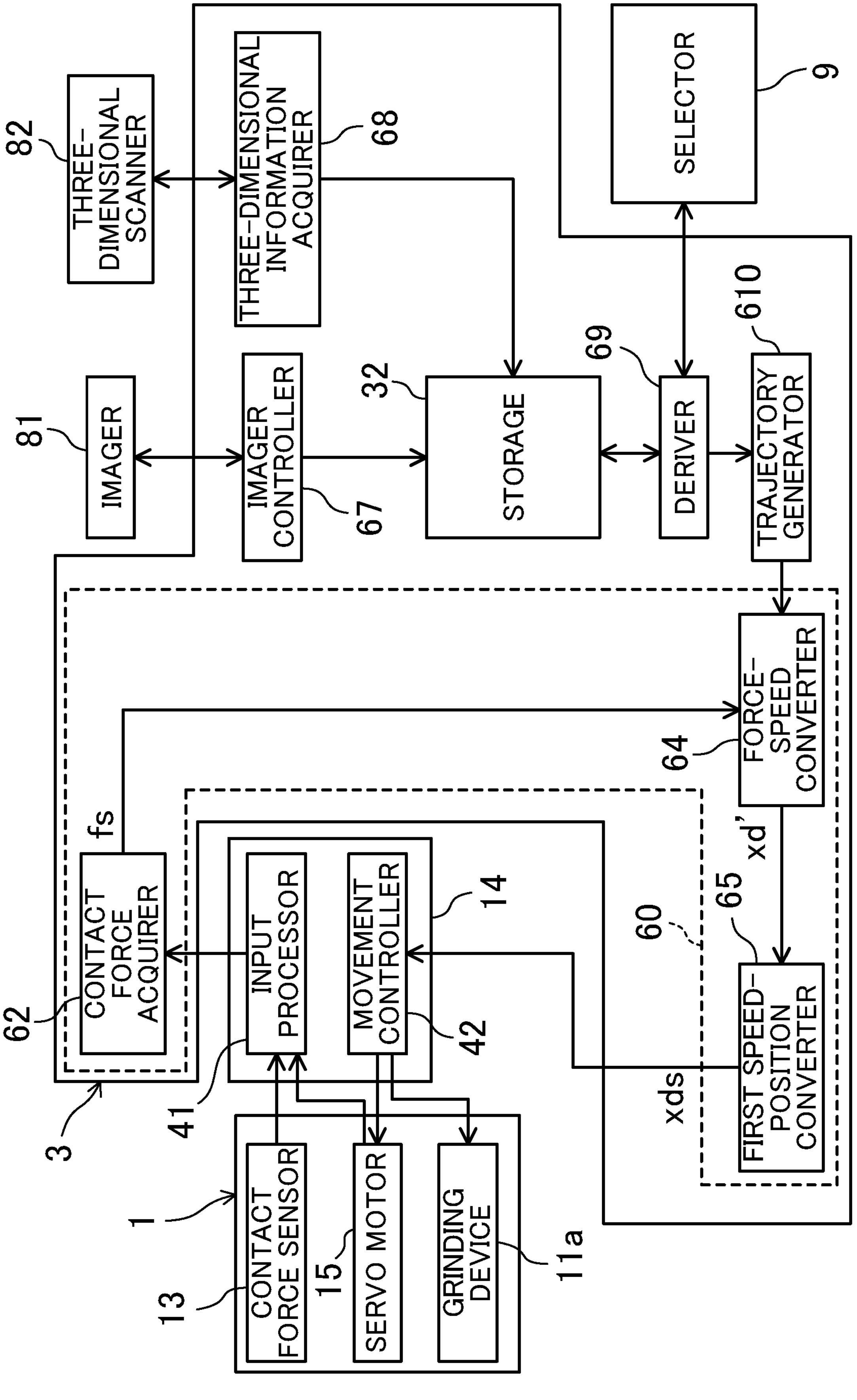
FIG. 6 is a block diagram showing the configuration of a control system for automatic control of the robot system.

Next, the automatic control of the robot system 100 will be described. FIG. 6 is a block diagram showing the configuration of a control system for the automatic control of the robot system 100.

The controller 31 of the controller 3 reads and loads the programs (e.g., processing program 32*a*) from the storage 32 into the memory 33, thereby implementing various functions. Specifically, the controller 31 functions as the movement commander 60, an imager controller 67, a three-dimensional information acquirer 68, a deriver 69, and a trajectory generator 610.

The movement commander 60 creates the command position xds of the robot arm 12, and outputs the created command position xds to the robot controller 14. The robot controller 14 creates a control command for the servo motor 15 based on the command position xds from the movement commander 60. The robot controller 14 applies supply current corresponding to the control command to the servo motor 15. At this time, the robot controller 14 performs feedback control of the current supplied to the servo motor 15 based on the detection result of the encoder.

For example, the movement commander 60 creates the command position xds to move the imager 81 and the three-dimensional scanner 82 to predetermined positions or cause the griding device 11*a* to perform grinding, and moves the robot arm 12.

The imager controller 67 controls the imager 81 to image the object W. The imager controller 67 stores, in the storage 32, the image acquired by the imager 81.

The three-dimensional information acquirer 68 controls the three-dimensional scanner 82 to acquire the point cloud data on the object W. The three-dimensional information acquirer 68 stores, in the storage 32, the point cloud data acquired by the three-dimensional scanner 82. Note that in a case where the coordinates of each point included in the point cloud data output from the three-dimensional scanner 82 is not according to the robot coordinate system, the three-dimensional information acquirer 68 converts the coordinates of each point included in the point cloud data into those in the robot coordinate system.

The deriver 69 derives the processing portion B in the three-dimensional information based on the selection of the processing portion B in the image of the object W by the selector 9. Moreover, the deriver 69 derives the reference surface R in the three-dimensional information on the object W based on the selection of the reference surface R in the image of the object W by the selector 9.

Specifically, in response to a request from the selector 9, the deriver 69 reads the image of the object W from the storage 32, and outputs the image to the selector 9. The output image of the object W is displayed on the display 91 of the selector 9. The operating person operates the input 92 to select the processing portion B in the image of the object W. In addition, the operating person operates the input 92 to select the reference surface R in the image of the object W. The deriver 69 receives the selection of the processing portion B and the reference surface R in the image of the object W from the selector 9.

The deriver 69 compares the image of the object W in which the processing portion B and the reference surface R have been selected with the point cloud data on the object W in the storage 32, and derives the processing portion B and the reference surface R in the point cloud data.

Specifically, the position of the imager 81 upon acquisition of the image of the object W and the position of the three-dimensional scanner 82 upon acquisition of the point cloud data on the object W are known, and therefore, it can be generally determined to which portion in the point cloud data on the object W a certain portion in the image of the object W corresponds. The deriver 69 identifies a portion corresponding to the processing portion B selected in the image of the object W from the point cloud data on the object W, and as the processing portion B, sets a portion protruding as compared to the periphery thereof at the identified portion. Moreover, the deriver 69 identifies a portion corresponding to the reference surface R selected in the image of the object W from the point cloud data on the object W, and as the reference surface R, sets a surface including the identified portion. For example, the reference surface R is a smooth surface with less asperities, and may be a flat surface or a curved surface. In this manner, the deriver 69 derives the processing portion B and the reference surface R in the point cloud data on the object W.

The trajectory generator 610 generates the target trajectory of the griding device 11*a*, i.e., the target trajectory of the robot arm 12, based on the point cloud data on the object W. The target trajectory is a trajectory along the reference surface R, more specifically a trajectory substantially parallel with the reference surface R. The target trajectory may be generated in the form of layers. The target trajectories are arranged at intervals in the direction of normal to the reference surface R. The target trajectories may include a final target trajectory tracing the reference surface R.

Figure 7:
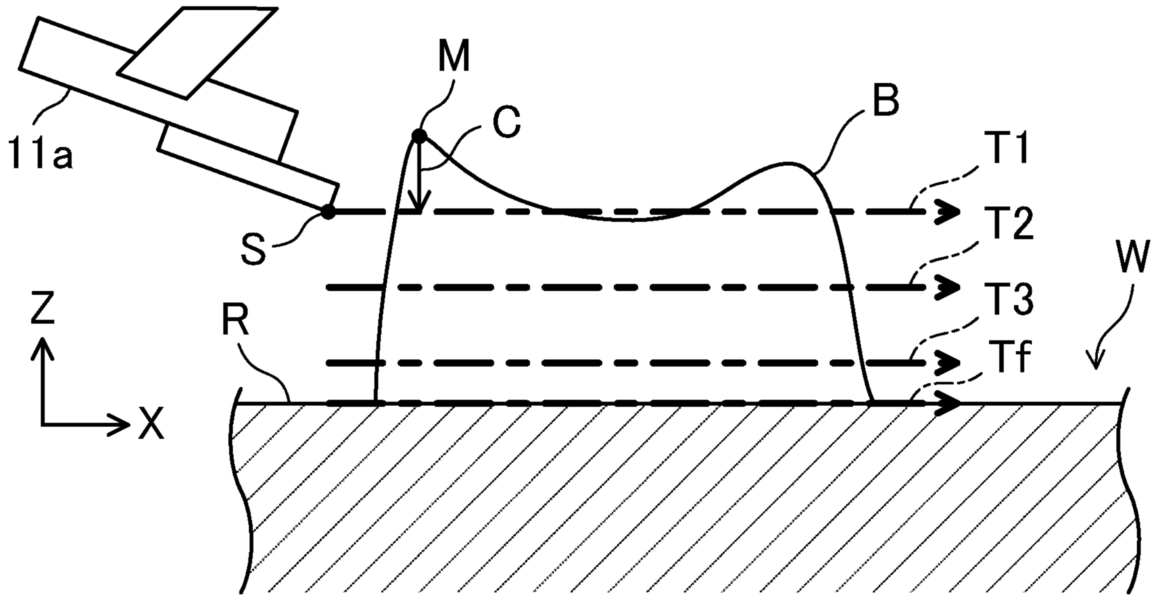
FIG. 7 is a schematic view of a processing portion and target trajectories.

FIG. 7 is a schematic view of the processing portion B and the target trajectories. Specifically, the trajectory generator 610 determines the start position S of the griding device 11*a* in the removal processing based on the point cloud data on the processing portion B. The trajectory generator 610 obtains the vertex M of the processing portion B farthest from the reference surface R in the point cloud data, and obtains a point shifted to the reference surface R from the vertex M in the direction of normal to the reference surface R by a predetermined cut amount C. The trajectory generator 610 obtains a virtual first target processing surface passing through the point shifted to the reference surface R and extending substantially parallel with the reference surface R, and as the start position S, obtains a point which is on the first target processing surface and is a point other than the processing portion B (i.e., point apart from the processing portion B). The trajectory generator 610 generates, as a first target trajectory T1, the target trajectory of the griding device 11*a* starting from the start position S, tracing the first target processing surface, and covering the substantially entirety of a portion of the processing portion B crossing the first target processing surface. Subsequently, the trajectory generator 610 sets a second target processing surface shifted to the reference surface R from the first target processing surface in the direction of normal to the reference surface R by the cut amount C, and as a second target trajectory T2, generates the target trajectory of the griding device 11*a* tracing the second target processing surface and covering the substantially entirety of a portion of the processing portion B crossing the second target processing surface. In this manner, the trajectory generator 610 sequentially generates the target trajectories at the positions shifted to the reference surface R from the vertex M in the direction of normal to the reference surface R by the cut amount C. In a case where the target trajectory is coincident with the reference surface R or is positioned lower than the reference surface R, the trajectory generator 610 generates, as a final target trajectory Tf, the target trajectory of the griding device 11*a* tracing the reference surface R and covering the substantially entirety of a portion of the processing portion B crossing the reference surface R.

Note that the number of target trajectories to be generated depends on the reference surface R, the vertex M, and the cut amount C. A number obtained in such a manner that one is added to a result obtained by dividing a distance from the reference surface R to the vertex M by the cut amount C is the number of target trajectories. In a case where the distance from the reference surface R to the vertex is the cut amount C or less, the number of target trajectories to be generated is one. That is, the number of target trajectories is not limited to a plural number.

The movement commander 60 moves the robot 1 such that the griding device 11*a* removes the processing portion B until reaching the reference surface R. The movement commander 60 moves the robot 1 such that the processing portion B is removed separately in multiple times from the start position S toward the reference surface R. Specifically, the movement commander 60 moves, sequentially using the first target trajectory T1 farthest from the reference surface R to the final target trajectory Tf, the robot 1 such that the griding device 11*a* moves along the target trajectory. For example, the movement commander 60 causes the griding device 11*a* to remove the processing portion B in the form of a layer separately in multiple times. At this time, the movement commander 60 executes position control for moving the robot 1 such that the griding device 11*a* moves along the target trajectory while executing elasticity control for moving the robot 1 such that the griding device 11*a* moves so as to deviate from the target trajectory according to the reactive force from the object W and the pressing force of the griding device 11*a* on the object W increases according to the distance from the target trajectory.

Specifically, the movement commander 60 functions as the contact force acquirer 62, the force-speed converter 64, and the first speed-position converter 65. Each function of the contact force acquirer 62, the force-speed converter 64, and the first speed-position converter 65 is basically similar to that in the case of the manual control. The automatic control is based on the position control according to the target trajectory, and therefore, the movement commander 60 does not function as the operation force acquirer 61, the adder 63, and the second speed-position converter 66.

The contact force acquirer 62 receives the sensor signal of the contact force sensor 13 via the input processor 41, and based on the sensor signal, acquires the contact force fs. The contact force acquirer 62 inputs the contact force fs to the force-speed converter 64. Moreover, the contact force acquirer 62 stores, in the storage 32, the contact force fs during grinding.

The force-speed converter 64 converts the input contact force fs into the command speed xd'. The force-speed converter 64 calculates the command speed xd' using the motion model based on the motion equation including the inertial coefficient, the viscosity coefficient (damper coefficient), and the stiffness coefficient (spring coefficient). Specifically, the force-speed converter 64 calculates the command speed xd' based on the motion equation of Equation (1). In Equation (1), e=xd-xu, xd is a command position, and xu is a target trajectory generated by the trajectory generator 610. The force-speed converter 64 converts the target trajectory xu into a target speed xu', and substitutes the target speed xu' into Equation (2). In this manner, the command speed xd' is obtained.

The first speed-position converter 65 converts, with reference to the robot coordinate system, the coordinate-converted command speed xd' into the command position xds for the robot 1. The first speed-position converter 65 outputs the obtained command position xds to the robot controller 14, specifically the movement controller 42. As described above, the movement controller 42 moves the robot arm 12 based on the command position xds. The first speed-position converter 65 stores, in the storage 32, the command position xds during grinding.

The motion model of Equation (1) includes the viscosity coefficient cd and the stiffness coefficient kd. Thus, the position control for moving the griding device 11*a* along the target trajectory xu is basically performed, and in a case where there is resistance on the target trajectory xu, the griding device 11*a* moves in such a trajectory that the griding device 11*a* applies pressing force against the resistance while avoiding the resistance by combination of elastic force and damping force. As a result, the griding device 11*a* grinds a portion of the processing portion B positioned on the target trajectory. This avoids the griding device 11*a* and therefore the robot arm 12 from receiving excessive reactive force from the robot arm 12.

In a case where the target trajectories are generated, the movement commander 60 moves the griding device 11*a* along the target trajectory in the order from the target trajectory farthest from the reference surface R. That is, the griding device 11*a* performs grinding along the target trajectory in descending order of distance from the reference surface R in a stepwise manner, and finally, performs grinding along the final target trajectory Tf which is coincident with the reference surface R.

Note that in the automatic control, the controller 3 does not generate or output the command position xdm for the operator 2. That is, the operator 2 does not perform position control for the handle 21.

[Operation of Robot System]

Next, operation of the robot system 100 configured in this manner will be described.

<Manual Control>

In the manual control, the user operates the operator 2 to cause the robot 1 to execute an actual process on the object W. For example, the user operates the operator 2 to cause the robot 1 to grind the object W. As user operation via the operator 2, the operation force applied to the handle 21 from the user is detected by the operation force sensor 23. The robot arm 12 is controlled according to the operation force.

Specifically, when the user operates the operator 2, the operation force applied from the user via the handle 21 is detected by the operation force sensor 23. At this time, the contact force sensor 13 of the robot 1 detects the contact force.

The operation force detected by the operation force sensor 23 is input as the detection signal to the controller 3 by the input processor 51. In the controller 3, the operation force acquirer 61 inputs the operation force fm based on the detection signal to the adder 63.

At this time, the contact force detected by the contact force sensor 13 is input as the sensor signal to the input processor 41. The sensor signal input to the input processor 41 is input to the contact force acquirer 62. The contact force acquirer 62 inputs the contact force fs based on the sensor signal to the adder 63.

The adder 63 inputs the resultant force fm+fs to the force-speed converter 64. The force-speed converter 64 obtains, using the resultant force fm+fs, the command speed xd' based on Equation (2).

For the robot 1, the first speed-position converter 65 obtains the command position xds from the command speed xd'. The movement controller 42 of the robot controller 14 moves the robot arm 12 according to the command position xds, and controls the position of the griding device 11*a*. In this manner, the pressing force corresponding to the operation force fm is applied to the object W while the object W is being ground by the griding device 11*a*.

On the other hand, for the operator 2, the second speed-position converter 66 obtains the command position xdm from the command speed xd'. The movement controller 52 of the operation controller 24 moves the support 22 according to the command position xdm, and controls the position of the handle 21. In this manner, the user senses the reactive force corresponding to the contact force fs.

The user performs such operation of the operator 2, and accordingly, the robot 1 processes the object W.

<Automatic Control>

Figure 8:
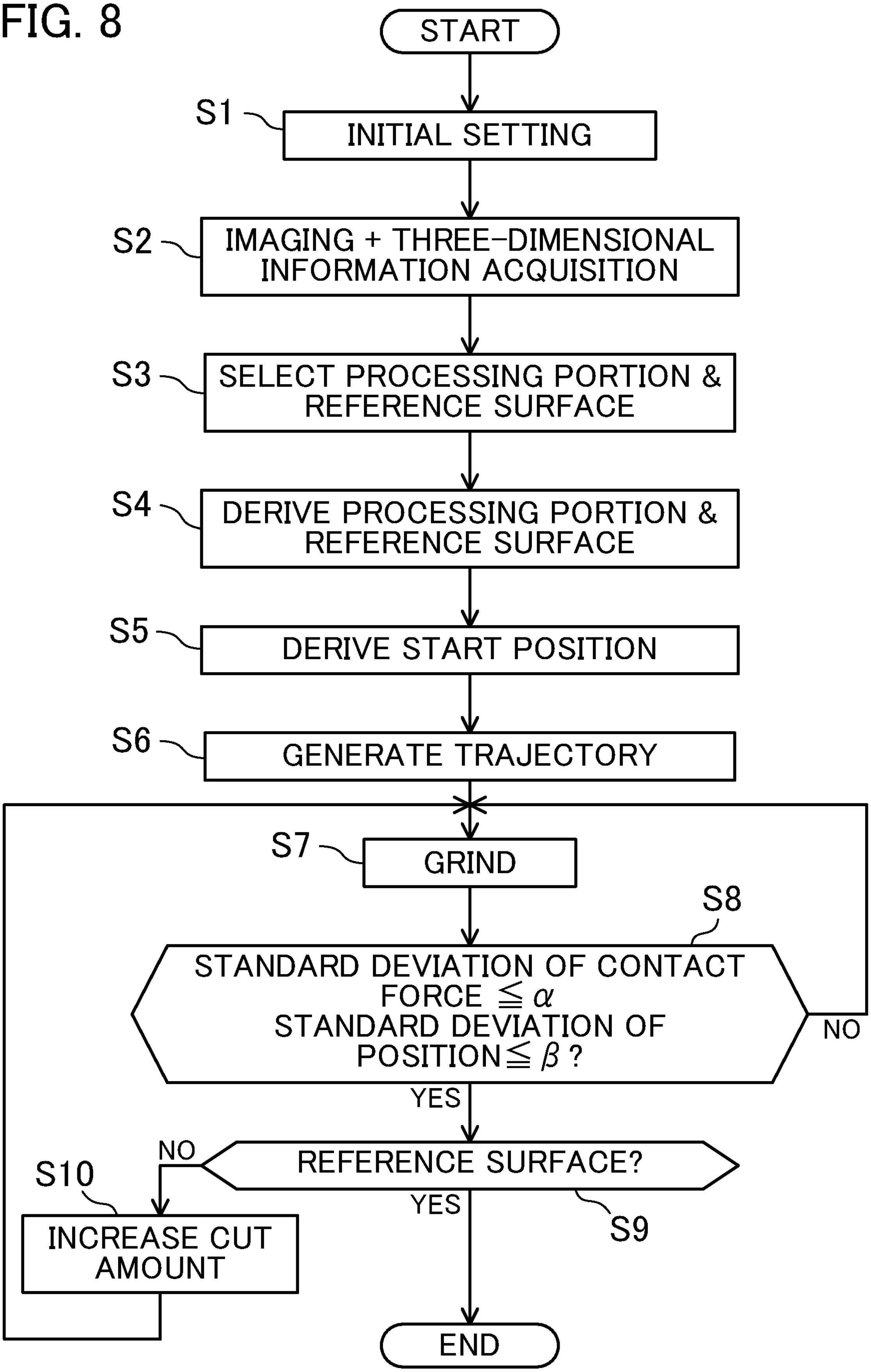
FIG. 8 is a flowchart of the automatic control of the robot system.

Subsequently, operation of the robot system 100 in the automatic control will be described. FIG. 8 is a flowchart of the automatic control of the robot system 100.

Figure 9:
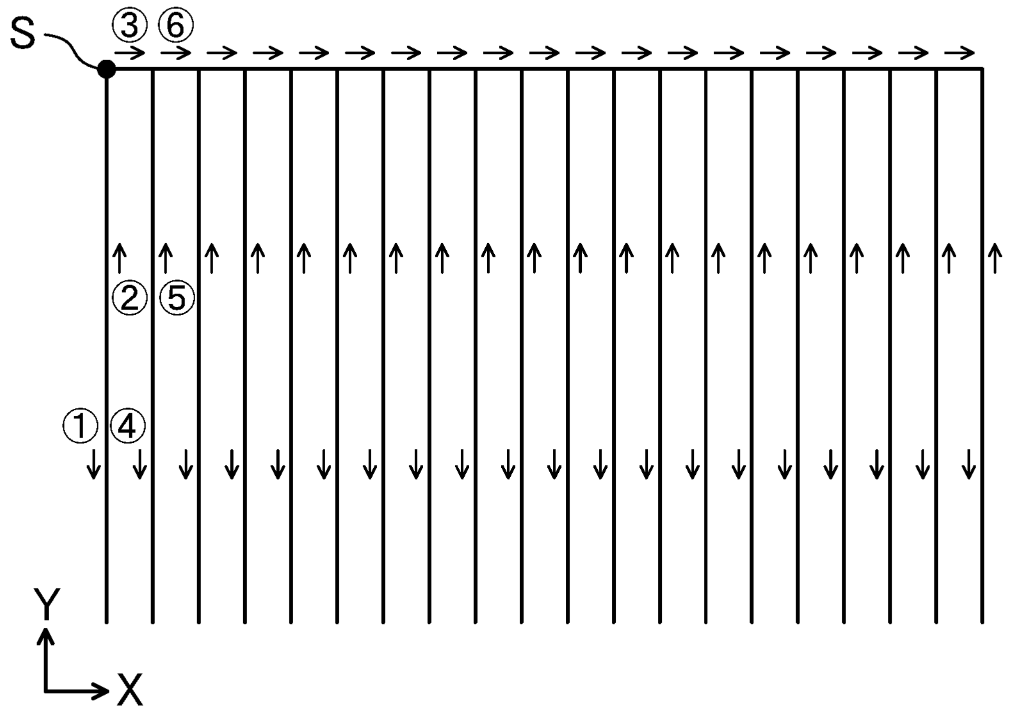
FIG. 9 is a first pattern of a target trajectory.
Figure 10:
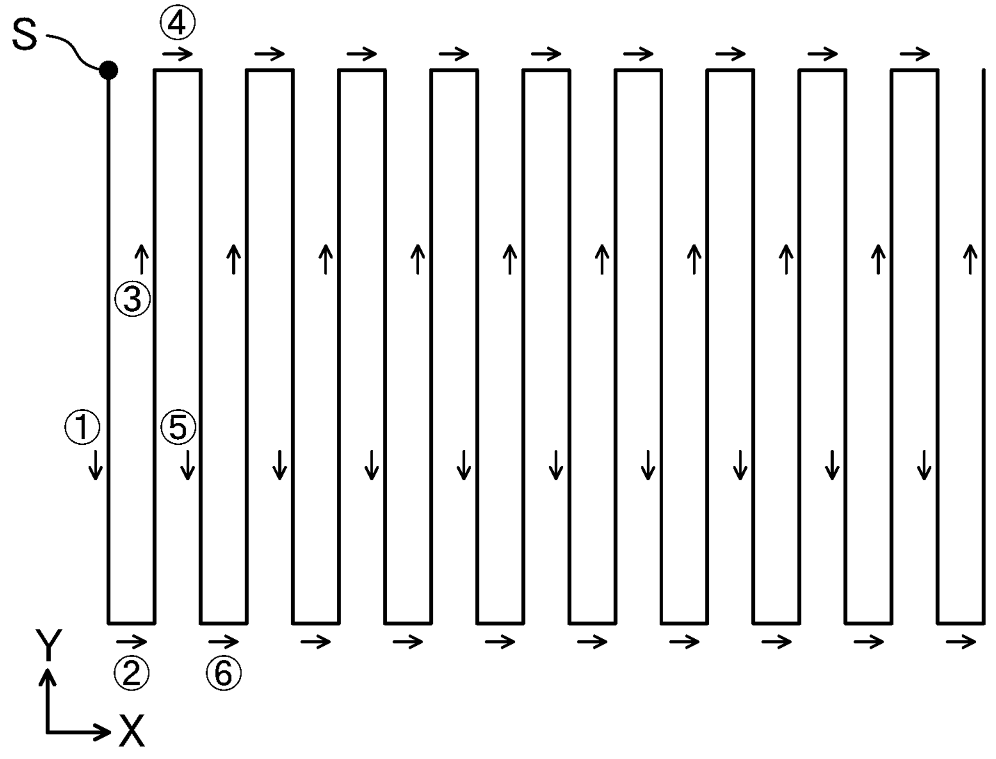
FIG. 10 is a second pattern of the target trajectory.

First, initial setting is performed in Step S1. The operating person performs initial setting on the automatic control via the selector 9. The initial settings are input to the controller 3 from the selector 9. For example, the initial settings include, for example, the input of the cut amount C of the griding device 11*a* and the selection of a target trajectory pattern. The cut amount C means a cut depth. Regarding a pattern of the target trajectory, various patterns of movement of the griding device 11*a* on one target processing surface for obtaining such a target processing surface are conceivable. The controller 3 has target trajectory patterns. FIG. 9 is a first pattern of the target trajectory, and FIG. 10 is a second pattern of the target trajectory. The first pattern is a trajectory on which the griding device 11*a* repeatedly moves so as to reciprocate along one path (e.g., path extending in the Y-direction), shift the path in a direction (e.g., X-direction) crossing the path, and reciprocate along the shifted path. The second pattern is a trajectory on which the griding device 11*a* repeatedly moves so as to move along one path (e.g., path extending in the Y-direction), shift the path in a direction (e.g., X-direction) crossing the path, and move along the shifted path. That is, in the first pattern, the griding device 11*a* passes one path twice. On the other hand, in the second pattern, the griding device 11*a* passes one path once. Note that the target processing surface may be a flat surface or a curved surface. The target trajectory pattern is not limited to above, and may be a trajectory on which the griding device 11*a* moves in a spiral pattern on the target processing surface.

After having input the initial settings, the operating person outputs an instruction for acquiring the image of the object W to the controller 3 via the selector 9. When receiving the imaging instruction, the controller 3 executes acquisition of the image of the object W and acquisition of the point cloud data on the object W, in Step S2. Specifically, the movement commander 60 moves the robot arm 12 such that the imager 81 and the three-dimensional scanner 82 are at the predetermined positions. Since the object W is placed on a fixed position on a support table, the predetermined positions of the imager 81 and the three-dimensional scanner 82 are also determined in advance.

Thereafter, the imager controller 67 causes the imager 81 to image the object W. The imager controller 67 stores, in the storage 32, the image of the object W acquired by the imager 81. The three-dimensional information acquirer 68 causes the three-dimensional scanner 82 to acquire the point cloud data on the object W. The three-dimensional scanner 82 acquires the point cloud data on the object W with the substantially same angle of view as that of the imager 81. The three-dimensional information acquirer 68 stores, in the storage 32, the point cloud data acquired by the three-dimensional scanner 82.

Note that in a case where the position of the robot arm 12 when the imager 81 is at the predetermined position and the position of the robot arm 12 when the three-dimensional scanner 82 is at the predetermined position are different from each other, the movement commander 60 may move the robot arm 12 between the time of imaging by the imager 81 and the time of acquisition of the point cloud data by the three-dimensional scanner 82.

Figure 11:
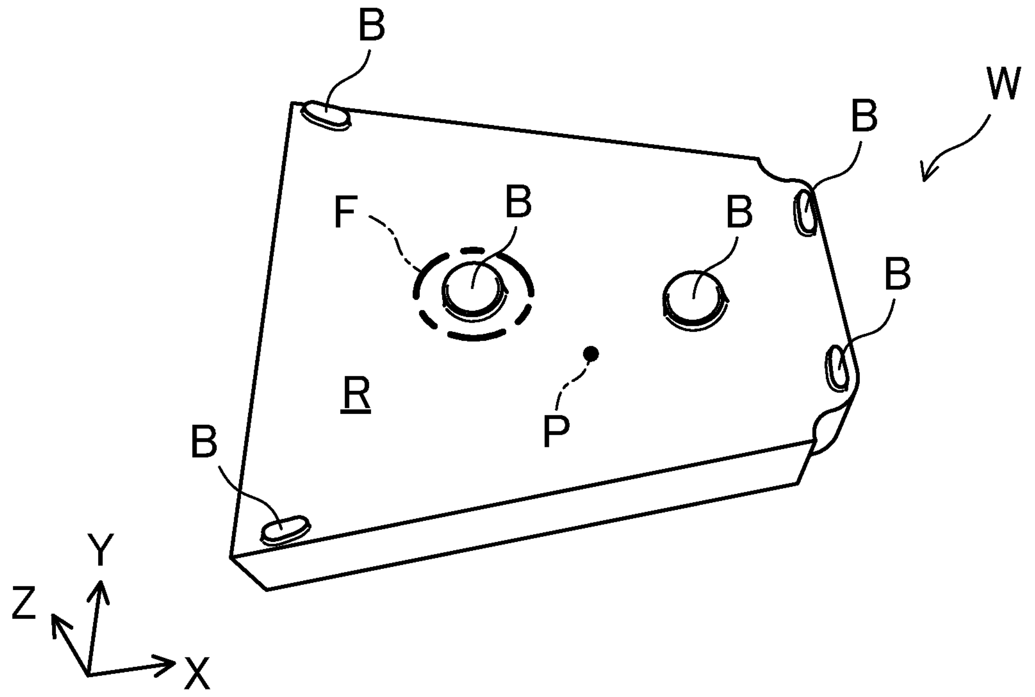
FIG. 11 is one example of an image of an object.

Subsequently, in Step S3, the controller 3 receives, from the selector 9, the selection of the processing portion B and the reference surface R in the image of the object W. Step S3 is equivalent to selecting the processing portion B of the object W in the image of the object W. FIG. 11 is one example of the image of the object W.

Specifically, the deriver 69 reads the image of the object W from the storage 32, and outputs the image to the selector 9. The output image of the object W is displayed on the display 91. The deriver 69 displays, on the image of the object W, a frame F for selecting the processing portion B and a point P for selecting the reference surface R. The operating person operates the input 92 to adjust the position and shape of the frame F such that the processing portion B in the image of the object W is positioned within the frame F. The operating person confirms the position and shape of the frame F, thereby selecting the processing portion B in the image of the object W. The deriver 69 identifies, as a portion including at least the processing portion B, a portion within the frame F confirmed by the selector 9 in the image of the object W.

Moreover, the operating person operates the input 92 to adjust the position of the point P such that the point P is positioned on the reference surface R in the image of the object W. The operating person confirms the position of the point P, thereby selecting the reference surface R in the image of the object W. The deriver 69 identifies, as a portion on the reference surface R, a portion at which the point P confirmed by the selector 9 in the image of the object W is positioned.

Figure 12:
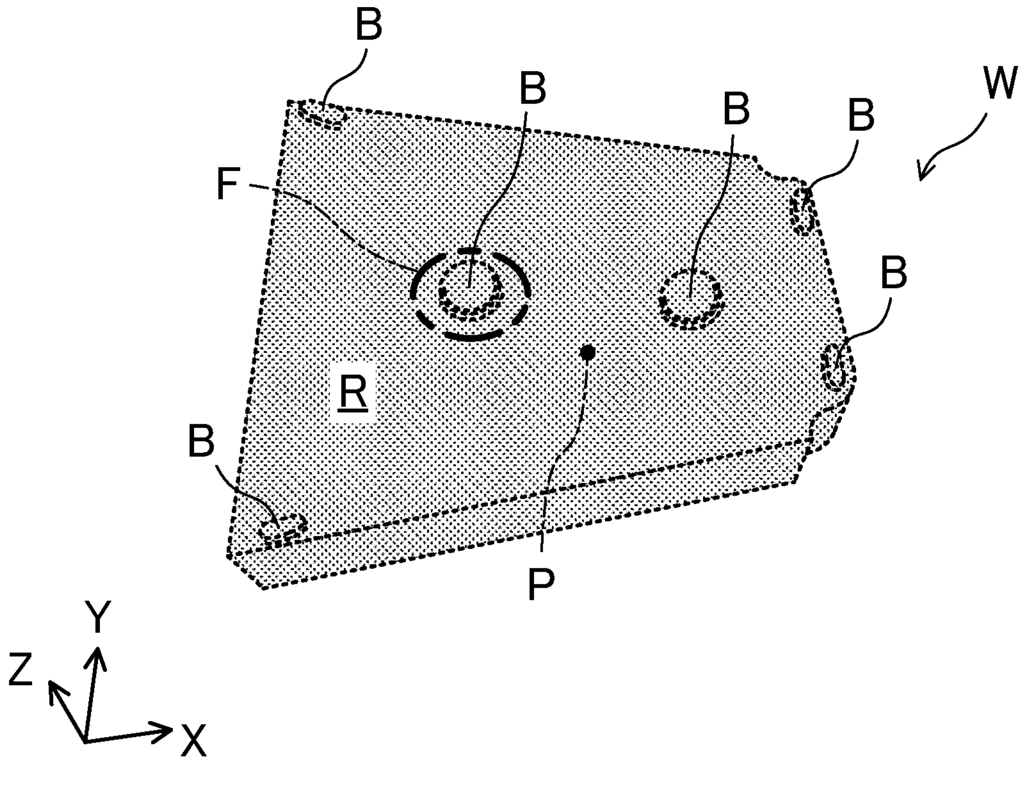
FIG. 12 is one example of three-dimensional information on the object.

Subsequently, in Step S4, the deriver 69 reads the point cloud data on the object W from the storage 32, compares the image of the object W and the point cloud data with each other, and derives portions of the point cloud data corresponding to the processing portion B and the reference surface R selected in the image of the object W. Step S4 is equivalent to deriving the processing portion B in the three-dimensional information based on the portion selected in the image and the three-dimensional information on the object W. FIG. 12 is one example of the three-dimensional information on the object W.

Specifically, the deriver 69 identifies, from the point cloud data on the object W, a portion corresponding to the portion surrounded by the frame F in the image of the object W, and as the processing portion B, sets a portion protruding as compared to the periphery thereof in a predetermined region including the identified portion. Moreover, the deriver 69 identifies, from the point cloud data on the object W, a portion corresponding to the point P in the image of the object W, and as the reference surface R, sets a surface including the identified portion. In a case where the surface including the identified portion is a flat surface, the reference surface R is a flat surface. In a case where the surface including the identified portion is a curved surface, the reference surface R is a curved surface. In this manner, the deriver 69 derives the processing portion B and the reference surface R in the point cloud data on the object W.

Next, in Step S5, the trajectory generator 610 derives the start position S of the removal processing. As described above, the trajectory generator 610 obtains the vertex M of the processing portion B in the point cloud data, obtains the first target processing surface passing through the point shifted to the reference surface R from the vertex M in the direction of normal to the reference surface R by the cut amount C, and obtains, as the start position S, the point which is on the first target processing surface and is outside the processing portion B.

Thereafter, in Step S6, the trajectory generator 610 generates the target trajectory. Step S6 is equivalent to generating the target trajectory of the tool of the robot tracing the processing portion of the object. The trajectory generator 610 generates, as the first target trajectory T1, the target trajectory of the griding device 11*a* starting from the start position S, tracing the first target processing surface, and covering the substantially entirety of the portion of the processing portion B crossing the first target processing surface. At this time, the trajectory generator 610 generates the target trajectory according to the target trajectory pattern set in initial setting.

Subsequently, the trajectory generator 610 sets the second target processing surface shifted to the reference surface R from the first target processing surface in the direction of normal to the reference surface R by the cut amount C, and generates the second target trajectory tracing the second target processing surface, as described above. The trajectory generator 610 repeats such a process until the final target trajectory Tf is generated on the reference surface R.

In this manner, the target trajectories arranged at intervals in the direction of normal to the reference surface R and extending on the reference surface R are generated.

Next, in Step S7, the movement commander 60 moves the robot 1 to execute grinding. Step S7 is equivalent to moving the robot 1 based on the three-dimensional information on the processing portion B to cause the robot 1 to remove the processing portion B. Moreover, Step S7 is equivalent to executing the position control for moving the robot such that the tool moves along the target trajectory and executing, in parallel with the position control, the elasticity control for moving the robot such that the tool moves so as to deviate from the target trajectory according to the reactive force from the object and the pressing force of the tool on the object increases according to the distance from the target trajectory. First, the movement commander 60 moves the robot arm 12 such that the griding device 11*a* moves along the first target trajectory T1. At this time, the movement commander 60 basically performs the position control for moving the griding device 11*a* along the target trajectory while executing the elasticity control in parallel. By the elasticity control, the griding device 11*a* deviates from the target trajectory to avoid excessive reactive force from the object W while moving on such a trajectory that moderate pressing force is applied to the object W. Note that the movement commander 60 also executes inertia control and viscosity control for the robot arm 12 in addition to the elasticity control.

Figure 13:
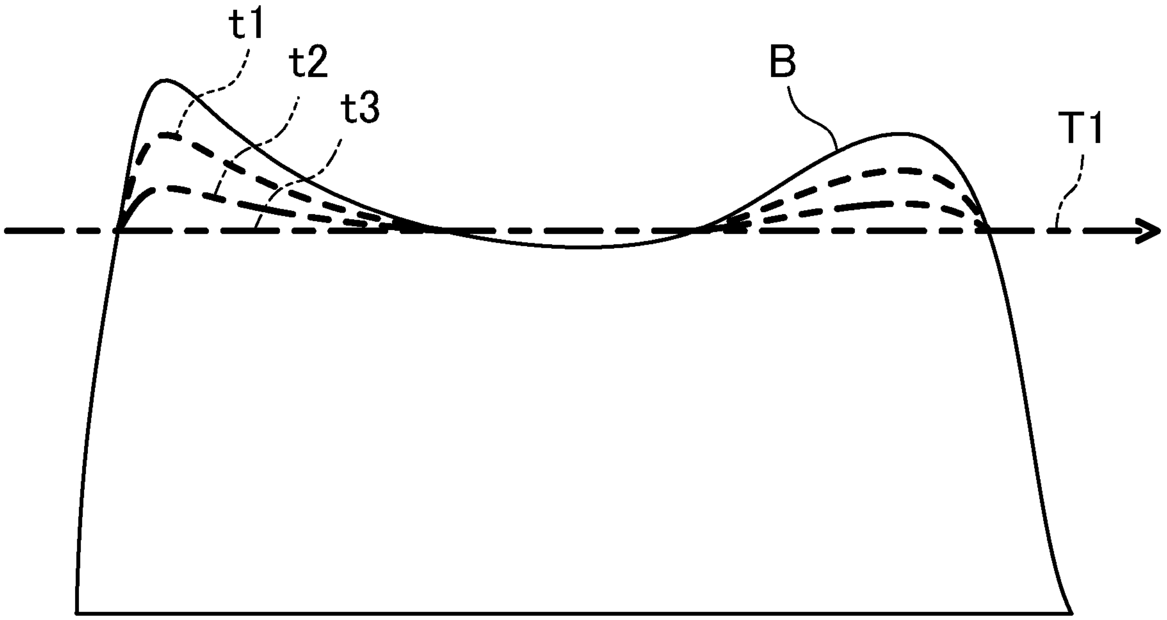
FIG. 13 is a schematic view of the trajectory of a grinding device in removal processing.

FIG. 13 is a schematic view of the trajectory of the griding device 11*a* in the removal processing. Specifically, as shown in FIG. 13, the griding device 11*a* moves on the first target trajectory T1 in a region where no processing portion B is present. When the griding device 11*a* contacts the processing portion B, the reactive force from the object W increases, and therefore, the griding device 11*a* deviates from the first target trajectory T1 toward the surface of the processing portion B due to the influence of the viscosity coefficient cd. However, the pressing force of the griding device 11*a* on the processing portion B increases, due to the influence of the stiffness coefficient kd, with an increase in the distance from the first target trajectory T1. That is, the cut amount of the processing portion B increases with an increase in the distance from the first target trajectory T1. On the other hand, in a region where the reactive force from the object W is small, the griding device 11*a* passes the vicinity of the first target trajectory T1. As a result, in the region where the processing portion B is present, the griding device 11*a* traces a first actual trajectory t1 between the first target trajectory T1 and the surface of the processing portion B, which is indicated by a dashed line in FIG. 13, and grinds the processing portion B with moderate pressing force.

While the griding device 11*a* is moving along the first target trajectory T1 (also including a case where the griding device 11*a* deviates from the first target trajectory T1), the movement commander 60 stores, in the storage 32, the contact force fs and the command position xds. When the first grinding along the first target trajectory T1 by the griding device 11*a* ends, the movement commander 60 reads the contact force fs and the command position xds upon grinding from the storage 32, and obtains the standard deviation of the contact force fs during grinding and the standard deviation of the command position xds during grinding. In Step S8, the movement commander 60 determines whether or not a grinding completion condition has been satisfied. For example, the completion condition is that a parameter associated with the removal processing (i.e., grinding) is stabilized. Specifically, the parameter associated with the removal processing is at least one of the contact force fs during grinding, the command position xd during grinding, the command speed xd' during grinding, the acceleration xd" of the griding device 11*a* during grinding, or the current supplied to the servo motor 15 during grinding. In this example, the completion condition is that the standard deviation of the contact force fs during grinding is a predetermined first threshold α or less and the standard deviation of the command position xds during grinding is a predetermined second threshold β or less.

That is, in a case where a portion greatly apart from the first target trajectory T1 is included in the processing portion B, the contact force fs is great, and therefore, the standard deviation of the contact force fs during grinding is great. The position of the griding device 11*a* in this case is also greatly apart from the first target trajectory T1, and therefore, the standard deviation of the command position xds during grinding is also great. The contact force fs during grinding being the first threshold α or less and the standard deviation of the command position xds during grinding being the second threshold β or less mean that the processing portion B is ground substantially into a shape along the first target trajectory T1.

In a case where the completion condition is not satisfied, the processing portion B is not ground into a shape corresponding to the first target trajectory T1. In this case, the movement commander 60 returns to Step S7, and moves the robot arm 12 again such that the griding device 11*a* moves along the first target trajectory. By the first grinding, the processing portion B is ground substantially into a shape along the first actual trajectory t1. In second grinding, for example, in a region where the processing portion B is present, the griding device 11*a* traces a second actual trajectory t2 between the first target trajectory T1 and the first actual trajectory t1, which is indicated by a chain double-dashed line in FIG. 13, and grinds the processing portion B with moderate pressing force.

Also in the second grinding, in a case where the completion condition is not satisfied in Step S8, the movement commander 60 returns to Step S7, and moves the robot arm 12 again such that the griding device 11*a* moves along the first target trajectory. By the second grinding, the processing portion B is ground substantially into a shape along the second actual trajectory t2. In third grinding, for example, in a region where the processing portion B is present, the griding device 11*a* traces a third actual trajectory t3 substantially coincident with the first target trajectory T1, which is indicated by a chain line in FIG. 13, and grinds the processing portion B with moderate pressing force. Note that in a case where the reactive force from the object W is small, the influence of the elasticity control is small, and the position control is dominant. Thus, the griding device 11*a* traces a trajectory close to the first target trajectory T1. That is, excessive grinding of the object W beyond the first target trajectory T1 by the griding device 11*a* is prevented, and the object W is processed into a desired shape.

In a case where the completion condition has been satisfied, the movement commander 60 determines, in Step S9, whether or not the griding device 11*a* has reached the reference surface R. That is, the movement commander 60 determines whether or not the target trajectory in a case where the condition of Step S8 has been satisfied is the final target trajectory Tf.

In a case where the griding device 11*a* does not reach the reference surface R yet, the movement commander 60 increases the cut amount of the griding device 11*a* in Step S10. That is, the movement commander 60 switches the target trajectory to the next target trajectory (i.e., target trajectory closer to the reference surface R).

The movement commander 60 returns to Step S7, and executes grinding along the new target trajectory. On the new target trajectory, the movement commander 60 repeats movement of the griding device 11*a* along the target trajectory until the completion condition is satisfied.

In this manner, the movement commander 60 moves the griding device 11*a* along one target trajectory to perform the removal processing. Thereafter, in a case where the completion condition has been satisfied, the removal processing is performed with the target trajectory switched to the next target trajectory. On the other hand, in a case where the completion condition is not satisfied, the movement commander 60 moves the griding device 11*a* again along the one target trajectory (i.e., same target trajectory) to perform the removal processing. The movement commander 60 repeats such processing until the completion condition is satisfied in grinding along the final target trajectory Tf.

When the completion condition is satisfied in grinding along the final target trajectory Tf, the movement commander 60 ends the automatic control through the Step S9.

In a case where processing portions B are present on the object W, the processing from Step S1 may be repeated the number of times corresponding to the number of processing portions B. Alternatively, the processing portions B may be selected in Step S2, and the processing from Step S3 may be repeated the number of times corresponding to the number of processing portions B.

Note that in a case where the processing portion B is not fully removed and remains after the automatic control, the processing portion B may be removed by the manual control.

As described above, according to the automatic control of the robot system 100, in a case where the reactive force from the object W is great, the elasticity control is executed, in parallel with the position control for the griding device 11*a* along the target trajectory, such that the griding device 11*a* deviates from the target trajectory and the pressing force on the object W increases according to the distance from the target trajectory. Thus, action of excessive reactive force on the griding device 11*a* and therefore the robot 1 is prevented. In addition, the pressing force on the object W increases according to the distance from the target trajectory of the griding device 11*a*, and therefore, not only excessive reactive force can be avoided, but also moderate pressing force can be applied. Further, the position control along the target trajectory is executed for the griding device 11*a*, and therefore, excessive grinding, i.e., excessive removal, of the object W is prevented. As a result, action of excessive force on the griding device 11*a* and the robot 1 can be prevented while the object W is processed into a desired shape.

The controller 3 generates at least the target trajectory tracing the reference surface R, and using such a target trajectory, grinds the processing portion B until reaching the reference surface R. Thus, excessive grinding of the object W can be prevented.

Further, the controller 3 executes grinding of the processing portion B separately in multiple times toward the reference surface R. That is, the controller 3 generates the target trajectories arranged in the direction toward the reference surface R, and executes grinding sequentially using the target trajectories starting from the target trajectory farther from the reference surface R. The processing portion B is ground in the form of a layer little by little. Thus, action of excessive reactive force on the griding device 11*a* and therefore the robot 1 is further prevented.

There is a probability that the griding device 11*a* deviates from the target trajectory due to the elasticity control, and therefore, there is a probability that the processing portion B cannot be ground along the target trajectory only by one grinding. For this reason, the controller 3 sets the completion condition. The controller 3 switches one target trajectory to the next target trajectory in a case where the completion condition has been satisfied, and on the other hand, executes grinding again using the same target trajectory in a case where the completion condition is not satisfied. Grinding is performed multiple times using the same target trajectory, and therefore, the processing portion B is easily processed into the desired shape even if the processing portion B is ground little by little.

As described above, the robot system 100 includes the robot 1 that removes the processing portion B of the object W by the griding device 11*a* (tool) and the controller 3 that controls the robot 1. The controller 3 has the trajectory generator 610 that generates the target trajectory of the griding device 11*a* tracing the processing portion B and the movement commander 60 that executes the position control for moving the robot 1 such that the griding device 11*a* moves along the target trajectory while executing the elasticity control for moving the robot 1 such that the griding device 11*a* moves so as to deviate from the target trajectory according to the reactive force from the object W and the pressing force of the griding device 11*a* on the object W increases according to the distance from the target trajectory.

In other words, the method of the processing by the robot 1 includes the generating the target trajectory of the griding device 11*a* of the robot 1 tracing the processing portion B of the object W, the executing the position control for moving the robot 1 such that the griding device 11*a* moves along the target trajectory, and the executing, in parallel with the position control, the elasticity control for moving the robot 1 such that the griding device 11*a* moves so as to deviate from the target trajectory according to the reactive force from the object W and the pressing force of the griding device 11*a* on the object W increases according to the distance from the target trajectory.

The processing program 32*a* causes, for causing the robot 1 to remove the processing portion B of the object W, the computer to execute the generating the target trajectory of the griding device 11*a* of the robot 1 tracing the processing portion B of the object W, the executing the position control for moving the robot 1 such that the griding device 11*a* moves along the target trajectory, and the executing, in parallel with the position control, the elasticity control for moving the robot 1 such that the griding device 11*a* moves so as to deviate from the target trajectory according to the reactive force from the object W and the pressing force of the griding device 11*a* on the object W increases according to the distance from the target trajectory.

According to this configuration, the position control and the elasticity control are performed in parallel when the processing portion B is removed by the griding device 11*a*. Thus, the griding device 11*a* basically moves along the target trajectory, and in a case where the reactive force from the object W is great, the griding device 11*a* deviates from the target trajectory and the pressing force on the object W increases according to the distance from the target trajectory. As a result, excessive reactive force on the griding device 11*a* and the robot 1 from the object W can be prevented while the object W can be processed into the desired shape with moderate pressing force on the object W.

Note that as described above, the inertia control and the viscosity control may be additionally performed for the robot 1 in addition to the elasticity control.

The trajectory generator 610 generates the target trajectory tracing the reference surface R of the object W on which the processing portion B is present, and the movement commander 60 moves the robot 1 such that the griding device 11*a* removes the processing portion B until reaching the reference surface R.

According to this configuration, the target trajectory tracing the reference surface R is generated, and the processing portion B is removed until reaching the reference surface R. Thus, excessive removal of the object W can be prevented.

The trajectory generator 610 generates the target trajectories arranged at intervals in the direction toward the reference surface R, the target trajectories include the final target trajectory tracing the reference surface R, and the movement commander 60 moves, sequentially using the target trajectory of the target trajectories farther from the reference surface R to the final target trajectory, the robot 1 such that the griding device 11*a* moves along the target trajectory.

That is, in the method of the processing by the robot 1, in the generating the target trajectory, the target trajectories arranged at intervals in the direction toward the reference surface R of the object W on which the processing portion B is present are generated, and the position control and the elasticity control are executed sequentially using the target trajectories starting from the target trajectory farther from the reference surface R.

In the processing program 32*a*, in the generating the target trajectory, the target trajectories arranged at intervals in the direction toward the reference surface R of the object W on which the processing portion B is present are generated, and the position control and the elasticity control are executed sequentially using the target trajectories starting from the target trajectory farther from the reference surface R.

According to this configuration, the processing portion B is removed separately in multiple times toward the reference surface R. Thus, the reactive force on the griding device 11*a* and the robot 1 from the object W can be reduced. Moreover, the processing portion B is removed little by little, and therefore, removal of a portion not to be removed can be prevented.

The movement commander 60 moves the griding device 11*a* along one target trajectory to perform the removal processing, and thereafter, performs the removal processing with the target trajectory switched to the next target trajectory in a case where the predetermined completion condition has been satisfied and moves the griding device 11*a* again along the one target trajectory to perform the removal processing in a case where the completion condition is not satisfied.

According to this configuration, the removal processing on the same target trajectory is continued until the completion condition is satisfied. That is, excessive reactive force and contact force are avoided by the elasticity control, and for this reason, there is a probability that the processing portion B cannot be removed as instructed by the target trajectory only by one removal processing. Thus, in a case where it is determined that the completion condition has been satisfied, the target trajectory is switched to the next target trajectory, and the next removal processing is executed. Consequently, the processing portion B can be reliably removed although the processing portion B is removed little by little.

The completion condition is that the parameter associated with the removal processing is stabilized.

According to this configuration, in a case where it is determined that the parameter associated with the removal processing is stabilized, the removal processing is performed with the target trajectory switched to the next target trajectory. The parameter associated with the removal processing changes according to the degree of removal of the object W. In a case where the amount of removal of the object W is small, the change in the parameter associated with the removal processing is small, i.e., the parameter associated with the removal processing is assumed to be stabilized. Thus, the movement commander 60 determines that the completion condition has been satisfied when the parameter associated with the removal processing is stabilized.

More specifically, the parameter associated with the removal processing is at least one of the contact force fs of the griding device 11*a* on the object W during the removal processing, the command position xd of the griding device 11*a* during the removal processing, the command speed xd' of the griding device 11*a* during the removal processing, or the acceleration xd" of the griding device 11*a* during the removal processing.

According to this configuration, the removal processing on the same target trajectory is continued until at least one of the contact force fs of the griding device 11*a* on the object W during the removal processing, the command position xd of the griding device 11*a* during the removal processing, the command speed xd' of the griding device 11*a* during the removal processing, or the acceleration xd" of the griding device 11*a* during the removal processing decreases (e.g., reaches a predetermined threshold or less). When at least one of the contact force fs of the griding device 11*a* on the object W during the removal processing, the command position xd of the griding device 11*a* during the removal processing, the command speed xd' of the griding device 11*a* during the removal processing, or the acceleration xd" of the griding device 11*a* during the removal processing is stabilized (e.g., the change during the removal processing becomes smaller), such a state can be taken as the removal processing being sufficiently executed. In a case where it is determined that the removal processing has been sufficiently executed, the target trajectory is switched to the next target trajectory, and the next removal processing is executed. Thus, the processing portion B can be reliably removed although the processing portion B is removed little by little.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the robot 1 is not limited to one capable of implementing the bilateral control. For example, the operator 2 may be omitted.

The object is not limited to the casted product. The object may be an arbitrary workpiece as long as the workpiece includes the processing portion. The processing portion is not limited to the burr. The processing portion may be an arbitrary portion as long as such a portion needs to be processed.

The imager 81 is not necessarily disposed on the robot arm 12. For example, the imager 81 may be fixed to a location apart from the robot 1. For example, the imager 81 may be separated from the robot 1, and be located above the object W.

The three-dimensional scanner 82 is not necessarily disposed on the robot arm 12. For example, the three-dimensional scanner 82 may be fixed to a location apart from the robot 1. For example, the three-dimensional scanner 82 may be separated from the robot 1, and be located above the object W.

The three-dimensional information on the object is not limited to the point cloud data. The three-dimensional information is only required to be information expressing the three-dimensional shape of the object. For example, the three-dimensional information may be a depth image.

The image of the object W and the three-dimensional information on the object W are not limited to those acquired by the imager 81 and the three-dimensional scanner 82 disposed on the robot 1. The image of the object W and the three-dimensional information on the object W may be acquired and held in the storage 32 in advance.

The method for selecting the processing portion B and the reference surface R in the image of the object W is not limited to one described above. The processing portion B in the image is not necessarily selected using the frame F, but may be selected using the point P. The controller 3 may obtains a portion of the three-dimensional information corresponding to the point P in the image, and as the processing portion B, derive a portion including the obtained portion and protruding as compared to the periphery thereof. Further, a portion around the processing portion B may be derived as the reference surface R.

The controller 3 does not necessarily directly receive the selection of the reference surface R, and may receive only the selection of the processing portion B in the image via the selector 9. That is, based on the portion selected in the image of the object W by the selector 9 and the three-dimensional information on the object W, the controller 3 may derive the processing portion B in the three-dimensional information, and derive the surface around the processing portion B as the reference surface R. In this manner, the controller 3 also derives, without directly receiving the selection of the reference surface R, the reference surface R in addition to the processing portion B by receiving the selection of the processing portion B.

The removal processing method is not limited to one in the description above. The controller 3 removes the processing portion B separately in multiple times toward the reference surface R, but the present disclosure is not limited thereto. The controller 3 may generate only the final target trajectory Tf, and may perform grinding along the final target trajectory Tf from the beginning.

When transitioning one target trajectory to the next target trajectory, the movement commander 60 determines whether or not the grinding completion condition has been satisfied, but the present disclosure is not limited thereto. That is, when grinding along one target trajectory ends, the movement commander 60 may transition to grinding along the next target trajectory without confirming whether or not the completion condition has been satisfied.

The completion condition is not limited to the above-described contents. For example, the completion condition may be that the standard deviation of the contact force fs during grinding is the predetermined first threshold $\alpha$ or less. The completion condition may be that the standard deviation of the command position xds during grinding is the predetermined second threshold $\beta$ or less. The completion condition may be that at least one of the condition where the standard deviation of the contact force fs during grinding is the predetermined first threshold α or less or the condition where the standard deviation of the command position xds during grinding is the predetermined second threshold β or less is satisfied.

The controller 3 performs the position control and the elasticity control using the motion model expressed by Equation (1), but the position control and the elasticity control are not limited thereto. The position control and the elasticity control using an arbitrary model may be employed as long as the position of the tool is controlled such that the tool moves along the target trajectory while the control is made such that the tool deviates from the target trajectory and applies the pressing force on the object according to the distance from the target trajectory in a case where the reactive force on the tool from the object is great.

The above-described flowchart is merely one example, and changes, replacements, additions, omissions, etc. may be made to the step(s) in the flowchart. Alternatively, the order of steps in the flowchart may be changed, or steps performed in series may be processed in parallel.

The functions implemented by the components described in the present specification may be installed in a circuitry or a processing circuitry programmed to implement these described functions and including a general-purpose processor, an application specific processor, an integrated circuit, an application specific integrated circuit (ASIC), a central processing unit (CPU), a conventional circuit, and/or a combination thereof. The processor includes a transistor and other circuits, and is taken as a circuit or an arithmetic circuit. The processor may be a programmed processor that executes a program saved in a memory.

In the present specification, a circuitry, a unit, or means is hardware programmed or configured to implement the described functions. The hardware is any hardware disclosed in the present embodiment or any well-known hardware programmed or configured to implement the described functions.

In a case where the hardware is a processor of a circuitry type, the circuitry, means, or unit is a combination of hardware and software used for configuring the hardware and/or the processor.

The invention claimed is:

1. A robot system comprising:

a robot that performs removal processing to remove a processing portion of an object by a tool, the processing portion comprising a plurality of protrusions protruding from a surface of the object; and a controller that controls the robot to perform the removal processing, wherein the controller is configured to perform operations comprising:

operation as a trajectory generator that generates one or more target trajectories of the tool tracing the processing portion; and operation as a movement commander that executes position control for moving the robot such that the tool moves along the one or more target trajectories while executing elasticity control for moving the robot such that the tool moves so as to deviate from the respective target trajectory according to reactive force from the object, operation as the trajectory generator further comprises:

obtaining a vertex of the processing portion that comprises one of the plurality of protrusions that protrudes farthest from the reference surface;

obtaining a start position for the removal processing of the processing portion by setting a first target trajectory of the one or more target trajectories shifted from the vertex toward the reference surface by a distance corresponding to a cut amount of the removal processing and setting the start position on the first target trajectory outside the processing portion; and generating the one or more target trajectories each arranged at an interval from one another in a direction toward the reference surface, the one or more target trajectories including a final target trajectory tracing the reference surface, operation as the movement commander comprises moving the robot sequentially from one target trajectory to a next target trajectory toward the reference surface starting from the start position on the first target trajectory of the one or more target trajectories farthest from the reference surface to the final target trajectory, such that the tool moves along each of the one or more target trajectories, a number of the one or more target trajectories is generated based on a distance of the tool from the reference surface, a distance of the vertex from the reference surface, and the cut amount of the processing portion corresponding to the interval, and based on the next target trajectory being coincident with or positioned lower than the reference surface, operation as the trajectory generator further comprises generating, the final target trajectory that traces the reference surface.

2. The robot system of claim 1, wherein operation as the movement commander comprises moving the tool along the one target trajectory to perform the removal processing, and thereafter, performing the removal processing with the target trajectory switched to the next target trajectory for a predetermined completion condition being satisfied or moving the tool again along the one target trajectory to perform the removal processing for the completion condition being not satisfied.

3. The robot system of claim 2, wherein the completion condition is that a parameter associated with the removal processing is stabilized.

4. The robot system of claim 3, wherein the parameter associated with the removal processing comprises at least one of a contact force of the tool on the object during the removal processing, a position of the tool during the removal processing, a speed of the tool during the removal processing, or an acceleration of the tool during the removal processing.

5. A robot processing method whereby a robot performs removal processing to remove a processing portion of an object by a tool, comprising a plurality of protrusions protruding from a surface of the object, the method comprising:

generating one or more target trajectories of the tool of the robot tracing a processing portion of an object;

executing position control for moving the robot such that the tool moves along the one or more target trajectories;

executing, in parallel with the position control, elasticity control for moving the robot such that the tool moves so as to deviate from the one or more target trajectories according to reactive force from the object;

obtaining a vertex of the processing portion that comprises one of the plurality of protrusions that protrudes farthest from the reference surface;

obtaining a start position for the removal processing of the processing portion by setting a first target trajectory of the one or more target trajectories shifted from the vertex toward the reference surface by a distance corresponding to a cut amount of the removal processing and setting the start position on the first target trajectory outside the processing portion; and generating the one or more target trajectories each arranged at an interval from one another in a direction toward the reference surface, wherein the one or more target trajectories include a final target trajectory tracing the reference surface, executing position control comprises moving the robot sequentially from one target trajectory to a next target trajectory toward the reference surface starting from the start position on the first target trajectory of the one or more target trajectories farthest from the reference surface to the final target trajectory, such that the tool moves along each of the one or more target trajectories, a number of the one or more target trajectories is generated based on a distance of the tool from the reference surface, a distance of the vertex from the reference surface, and the cut amount of the processing portion corresponding to the interval, and based on the next target trajectory being coincident with or positioned lower than the reference surface, generating the one or more target trajectories further comprises generating, the final target trajectory that traces the reference surface.

6. A non-transitory storage medium storing a processing program for causing a robot to perform removal processing to remove a processing portion of an object by a tool, the processing portion comprising a plurality of protrusions protruding from a surface of the object, the processing program, when read and executed causing a computer to perform operations comprising:

generating one or more target trajectories of the tool of the robot tracing the processing portion of the object;

executing position control for moving the robot such that the tool moves along the one or more target trajectories;

executing, in parallel with the position control, elasticity control for moving the robot such that the tool moves so as to deviate from the one or more target trajectories according to reactive force from the object;

obtaining a vertex of the processing portion that comprises one of the plurality of protrusions that protrudes farthest from the reference surface;

obtaining a start position for the removal processing of the processing portion by setting a first target trajectory of the one or more target trajectories shifted from the vertex toward the reference surface by a distance corresponding to a cut amount of the removal processing and setting the start position on the first target trajectory outside the processing portion; and generating the one or more target trajectories each arranged at an interval from one another in a direction toward the reference surface, wherein the one or more target trajectories include a final target trajectory tracing the reference surface, executing position control comprises moving the robot sequentially from one target trajectory to a next target trajectory toward the reference surface starting from the start position on the first target trajectory of the one or more target trajectories farthest from the reference surface to the final target trajectory, such that the tool moves along each of the one or more target trajectories, a number of the one or more target trajectories is generated based on a distance of the tool from the reference surface, a distance of the vertex from the reference surface, and the cut amount of the processing portion corresponding to the interval, and based on the next target trajectory being coincident with or positioned lower than the reference surface, generating the one or more target trajectories further comprises generating, the final target trajectory that traces the reference surface.

* * * * *